United States Patent [19]

Sfredda

[11] 4,184,388
[45] Jan. 22, 1980

[54] INFINITELY VARIABLE SPEED TRANSMISSION

[76] Inventor: Albert Sfredda, 2106 Iris Pl., Bethlehem, Pa. 18018

[21] Appl. No.: 874,775

[22] Filed: Feb. 3, 1978

Related U.S. Application Data

[63] Continuation-in-part of Ser. No. 716,990, Aug. 24, 1976, Pat. No. 4,112,788.

[51] Int. Cl.² .............................................. F16H 57/10
[52] U.S. Cl. ..................................................... 74/793
[58] Field of Search ...................... 74/793, 796, 752 B

[56] References Cited

U.S. PATENT DOCUMENTS

| | | | |
|---|---|---|---|
| 1,306,330 | 6/1919 | Drew | 74/793 |
| 3,394,620 | 7/1968 | Tormolen | 74/793 X |
| 3,442,157 | 5/1969 | Novinger | 74/793 |
| 3,530,742 | 9/1970 | Sfredda | 74/796 |

FOREIGN PATENT DOCUMENTS 2335366  1/1975  Fed. Rep. of Germany ......... 74/752 B 4416484 of 1969 Japan ........................................ 74/793

Primary Examiner—Lance Chandler
Attorney, Agent, or Firm—Ruth Moyerman

[57] ABSTRACT

An infinitely variable speed transmission is disclosed in which, in a preferred embodiment, a drive shaft is connected to an adjustable drive spoke disposed within a rotatable toothed wheel. The drive force received by the wheel from the input drive shaft is imparted to either a sun gear or a ring gear or both. A second ring gear may be axially secured to the first ring gear. A second sun gear may be axially secured to the first ring gear. A planetary gear engages second sun and ring gears and transmits force received by it to an output shaft. When the drive spoke adjustment causes the second ring gear, through the first ring gear, to become the driving gear the slowest output speed results. Intermediate arc settings of the spoke at any point along about a 180° range results in both ring and sun gear driving the planetary gear simultaneously, but at an intermediate speed between the fastest and slowest setting.

9 Claims, 12 Drawing Figures

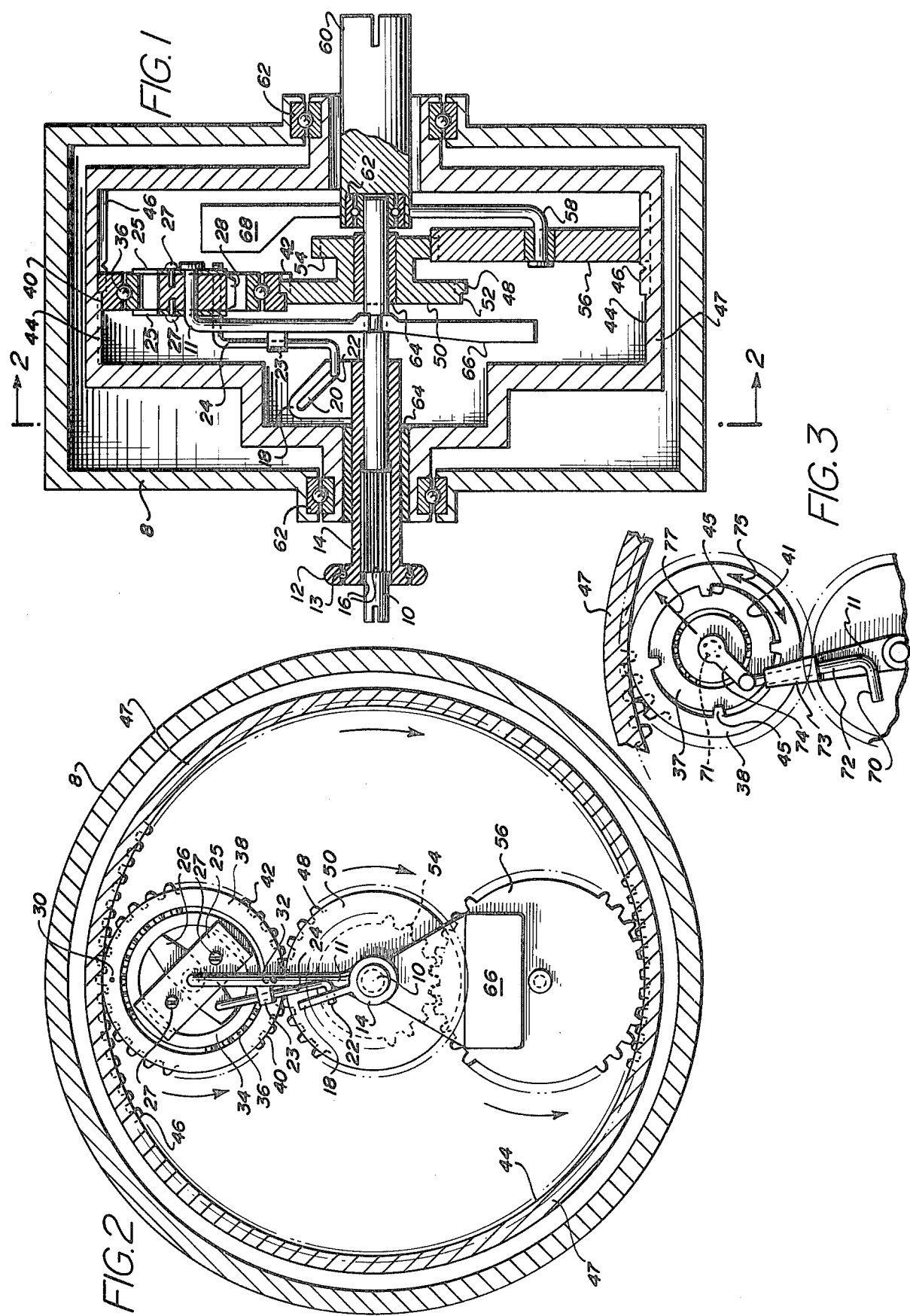

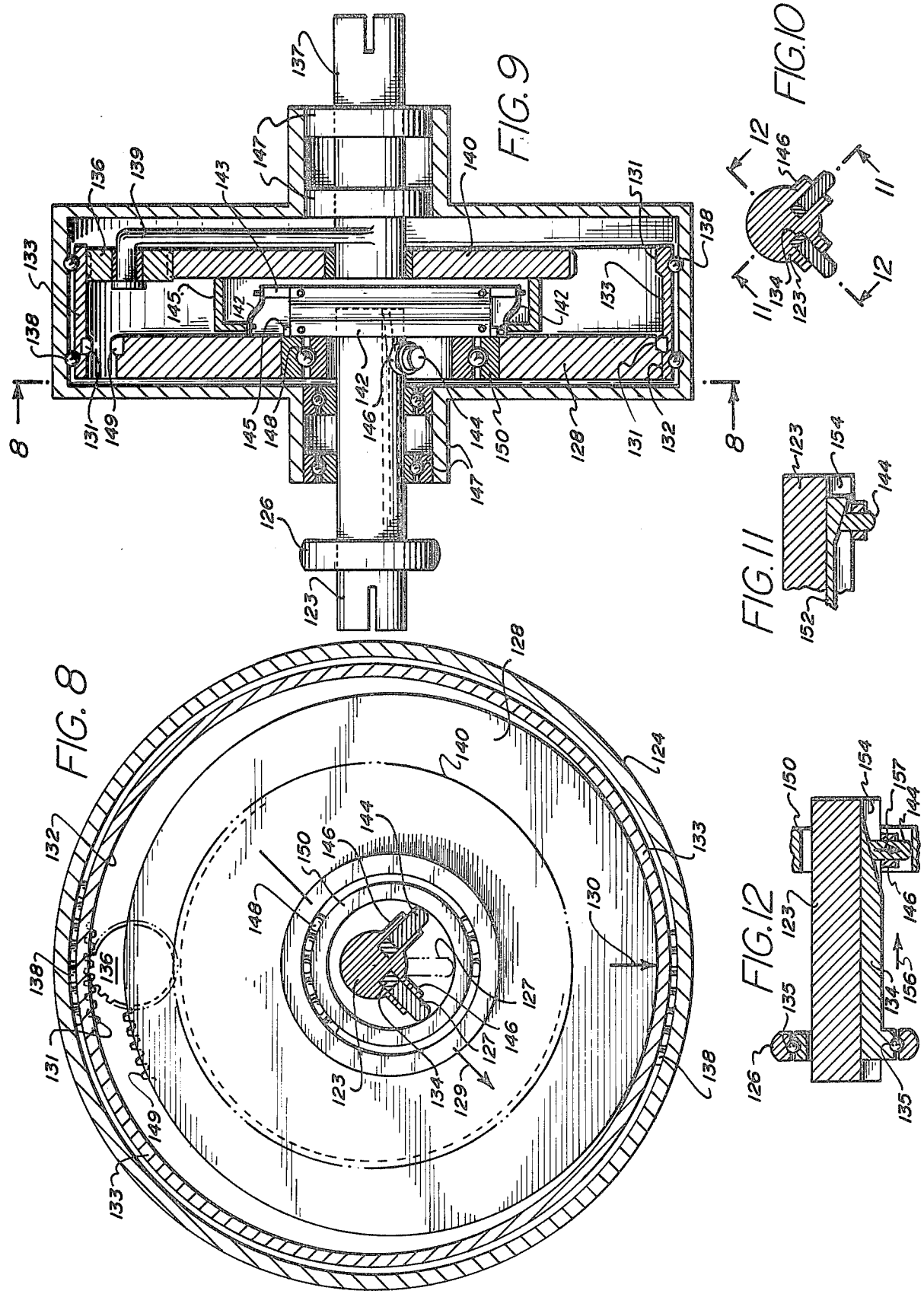

4,184,388

INFINITELY VARIABLE SPEED TRANSMISSION

BACKGROUND OF THE INVENTION

This application is a continuation in part of Ser. No. 716,990, filed Aug. 24, 1976 now U.S. Pat. No. 4,112,788.

1. Field of the Invention

This invention relates to machine elements and mechanisms and more particularly to planetary gearing.

2. Description of the Prior Art

The necessity and use of gear trains in transmissions, in for example, automobiles and trucks is recognized by all. Myriads of other uses in non-transportation areas exist as well.

However, regardless of the ultimate use to which the transmission is put, the transmissions themselves are all limited to only variable-ratio gear assemblies. That is to say, individual gear trains of different size gears are involved and therefore to change speed involves a shifting of gears.

The variable speed gear assemblies with the accompanying necessity of shifting gears to change speeds creates certain problems. A primary problem relates to the inherent requirement of fixed gear sizes which means fixed output speeds. That is, since the angular velocity of the input shaft is fixed, the speed of the output shaft is limited to only those preset ratios dictated by the size of the gears. Nothing intermediate is possible. If all speed requirements are predictable no problem may be encountered, but where a new intermediate speed is desired it becomes unattainable with such an arrangement. Secondly, in shifting the gears to shift from one speed to another the process necessarily produces jolts and discontinuities within and among—simultaneously—the power source, the transmission itself, and the actual device being driven. In some applications this behavior may be so damaging as to negate the usefulness of any or all of these three systems. Thirdly, because shifting gears normally necessitates temporary disengagement of the transmission from the power source, this condition itself often proves harmful somewhere within the transmission to the gears. A still further problem area may arise because the shifting of gears normally requires a modicum of skill that may or may not be possessed by the operator.

An infinitely variable transmission could eliminate the foregoing prior art problems and such a need has long been felt in the art.

One so-called infinitely variable drive exists. This is the infinitely variable friction drive. The friction drive eliminates gears and instead utilizes two disks mounted perpendicularly to each other with one being the drive disk and the other being the driven or output disk. The drive disk derives its infinitely variable aspect from the perpendicular arrangement and the ability of the drive disk to engage the driven disk at any point on the radius of the driven disk—a result possible because no gears are involved in disk drive. Instead, as the engagement point is moved from the edge of the disk closer to the center of the drive disk, the faster the disk is turned. Any intermediary engagement position yields a proportionately varying input-to-output ratio, thus affording the property of infinite variability. Many other variations of disk drive exist including cone drive and toroidal drive. Whatever the style, all disk drive devices share one important disadvantage. That is, since no gears are involved, they must all rely on very high contact forces to achieve the friction necessary for practical operation. These forces, while necessary for operation, place an extreme burden on the shaft bearings which manifest in high torsional resistance and result in significantly decreased bearing life. Decreasing the contact forces to improve these conditions only results in slippage between the disks. Therefore, the user of disk drive must choose between one of two undesirable effects, each of which can be considered a major limitation of such a device.

There is therefore a need for a truly infinitely variable gear driven transmission—a transmission which will permit the load, be it car, truck or other device to be driven at each and every speed within the range of the device and to do so without shifting gear trains.

SUMMARY OF THE INVENTION

The aforementioned prior art problems are solved by the device of this invention in which an infinitely variable speed transmission is provided.

An essential part of the invention relates to a speed control mechanism which is utilized to transmit the input drive force to a sun wheel or ring gear or both. The speed control mechanism includes a control sleeve which is coaxially aligned with a conventional drive shaft of the assembly, but which in addition is capable of reciprocal, e.g. axial movement, with the drive shaft also. As a part of the reciprocal motion of the control sleeve a rod operates through cam means to, for example, a spoke assembly which is pivotally movable and may be fixed in any position along about a 180° arc.

In a preferred embodiment shown in FIGS. 1 and 2, a spoke is utilized and the spoke engages a toothed wheel (also part of the speed control mechanism). The effect of the setting of the spoke is to impart the input driving force of the shaft to the toothed wheel at a point along substantially a 180° arc from a point on the wheel 180° from that force fixing point.

The toothed wheel of the speed control mechanism simultaneously engages the rolling surface segment of a sun wheel and a ring gear. Dependent upon the point on the arc at which the force is originally preset and fixed, the driving force of the shaft is transmitted to either the ring gear or sun wheel, or both. If the ring gear is the main driving gear, a planetary gear engaging the ring gear will be driven at a relatively fast speed. In the alternative, where the spoke setting results in a driving force being imparted to the sun wheel, a sun gear which is an integral part of the sun wheel engages and drives the same planetary gear. However, because of the different gear ratios between the sun and ring, when the sun gear provides the main drive, the planetary gear is driven at its slowest relative speed. Settings by the spoke mechanism at intermediate positions between 0° and 180° along the toothed wheel will result in intermediate output speeds between the slowest and fastest speed, thus achieving the infinitely variable speed aspect of the invention.

A modified form of the speed control mechanism is shown in FIG. 3, wherein spoke means 26 and 28 are replaced by a rigid pivotal arm and attached roller 37.

FIGS. 4, 5 and 6 describe another alternate embodiment of the device of this invention in which the speed control mechanism utilizes a rack and pinion arrangement as a means of fixing the position of the spoke. Furthermore, in this embodiment, disk gear means are utilized in place of sun and ring gears to provide a right angle tooth engagement means between themselves and the toothed wheel of the speed control mechanism. A ring and sun gear secured to the disks will in turn impart the driving force to the output planetary gear.

A third alternate embodiment contemplates the use of an eccentric gearing arrangement and, as a part of the speed control mechanism, the eccentric gear arrangement is utilized to achieve the necessary function of arcuate force fixing.

It is therefore an object of this invention to provide an infinitely variable speed transmission either totally or substantially through the use of gearing mechanism.

It is a further object of this invention to provide a truly infinitely variable transmission in which the use of shifting gears to change speeds is eliminated.

It is a further object of this invention to provide a transmission in which the changing of speeds by the transmission is accomplished without disengaging and re-engaging gear trains.

It is a further object of this invention to accomplish the foregoing with a mechanism in which jolts and discontinuities between the power source, the transmission and the output device are obviated.

It is still another object of this invention, in one embodiment, to employ eccentric gearing to create a lever effect which will reduce the tangential force on gear teeth and thereby improve efficiency of the assembly and prolong gear life.

It is still another object of this invention to provide a transmission in which all foregoing objects may be achieved in a transmission which is capable, without limitation, of being driven at each and every speed within the total range of speeds of which the assembly is capable.

BRIEF DESCRIPTION OF THE DRAWINGS

FIG. 1 shows a cross section of a preferred embodiment of this invention.

FIG. 2 is a cross section taken on lines 1—1 of FIG. 1.

FIG. 3 shows a modified form of the speed control mechanism shown in FIGS. 1 and 2.

FIG. 8 shows a cross section of a third embodiment of this invention.

FIG. 9 shows a section taken on lines 9—9 of FIG. 8.

FIG. 10 shows the cam mechanism of the speed control mechanism of FIG. 9.

FIG. 11 is a cross section taken on lines 11—11 of FIG. 10.

FIG. 12 is a cross section taken on lines 12—12 of FIG. 10.

DETAILED DESCRIPTION

Figure 4:
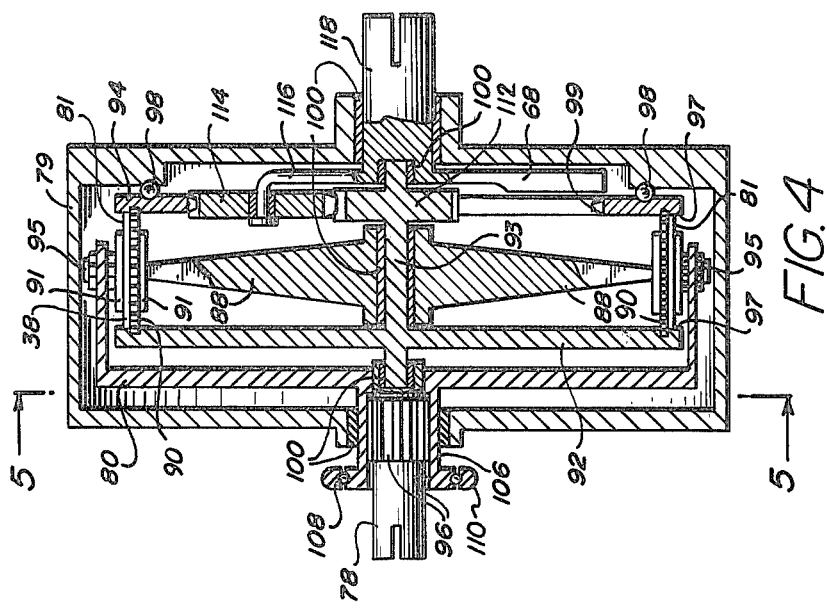
FIG. 4 shows a cross section of an alternate embodiment of this invention.

Referring now to FIG. 1 and FIG. 2, where like numbers designate like parts, within housing 8, input drive shaft 10 is rotatable. Drive arm 11 is rigidly connected to drive shaft 10 at its one end and at its other end pivotally supports spokes 26 and 28.

Control sleeve 14 is coaxially mounted on drive shaft 10, and rotates therewith by virtue of, for example, splines 16. Additionally, sleeve 14 is also reciprocally (axially) movable with respect to shaft 10. Axial movement of sleeve 14 may be manual or by any suitable linkage to control bearing outer race 12, as is well known in the art. Rolling elements 13 facilitate the relative rotary movement between outer race 12 and drive shaft 10. Cam support 18 is rigidly secured to sleeve 14. Control pin 22 rides in cam slot 20. The axial movement of cam slot 20 in connection with a reciprocal (lateral) motion of sleeve 14 will in turn cause pin 22 to move upwardly in the cam slot. The upward movement of pin 22 will cause control rod 24 to move in a transverse direction (radially with respect to drive shaft 10). Control rod 24 is supported in its movement by sleeve 23. Movement of control rod 24 causes pivotal movement of spokes 26 and 28. Spokes 26 and 28 are of a unitary structure and thus pivot the same degree distance.

A setting of the position of control sleeve 14 along drive shaft 10 manually, or by other means (not shown), determines the degree of rotation of spokes 26 and 28 and a setting of control sleeve 14 thus operates to set (fix) the position of the spokes. The arc of rotation of spoke 26 may be anywhere between imaginary points 30 and 32 which represent an arc of rotation of approximately 180°. Wheel support plates 25 are secured to both sides of spokes 26 and 28 by screws 27 and function to loosely retain wheel 38 in its axial position. Spoke 26 delivers a positive force to wheel 38 through its point of engagement with raceway 34. (Spoke 28 contacts raceway 34 only when reverse drive of the assembly is desired. That is, in reverse drive spoke 28 performs the same function as spoke 26). Spoke 26 fixidly engages wheel 38 through wheel raceway 34. Rolling elements 36 of wheel 38 permit wheel rotation. Toothed wheel 38 also includes, on its outer perimeter, wheel rolling surfaces 40 and wheel teeth 42 which engage corresponding ring rolling surface 44 and ring teeth 46 of ring 47. The use here of a rolling surface is highly desirable because of the high radial forces generated. In addition, wheel teeth 42 also engage sun wheel teeth 48 of sun wheel 50. Sun wheel 50 also includes rolling surface 52 which engages wheel rolling surface 40 in the same manner as previously described in connection with the rolling surfaces of ring 47 and wheel 38. Sun gear 54 is attached to sun wheel 50 as an integral part thereof.

Sun gear 54 in turn engages planetary gear 56. Planetary gear 56 also engages ring teeth 46 of ring 47.

Output or driven arm 58 interconnects planetary gear 56 to output shaft 60.

Predetermination of the relative pitch diameters of the engaging gears affect the overall range of the device. As an example, the portion of ring teeth 46 that engages planetary gear 56 can have a larger pitch diameter than the portion of ring teeth 46 that engages wheel teeth 42.

The assembly also includes ball bearings 62 which support the drive and driven shaft and numerous plain bearings 64 at various friction points as indicated. These bearings operate to reduce friction in a conventional manner as is well known in the art.

Weight counter balance 66 and 68 provide dynamic balance. Alternately, balance may also be provided by substituting additional planetary gears to achieve the weight balance effect within the assembly as is well known in the art.

During operation of the transmission, rotation of drive shaft 10 and connecting drive arm 11 produces planetary clockwise rotation of toothed wheel 38 through spoke 26. Spoke 26 is adjusted by the axial movement of control rod 24 by cam slot 20. Spoke 26 can be preset at any point on its arc of rotation. This arc of rotation ranges from between the imaginary points 30 and 32. The force vectors produced by the speed control adjusting effect of spoke 26 on toothed wheel 38 are as follows: the arc position of spoke 26 will determine whether the rotation of wheel 38 will transmit a driving force to ring 47 or to sun wheel 50 or proportionately to both at the same time.

As an example, if spoke 26 is fixed at point 30, the tangential force transmitted to ring 47 by wheel 38 will be near zero.

(A basic part of this invention is an extension of a new principle that I have introduced in the parent prior application Ser. No. 716,990 wherein a lever effect is imparted to a rolling gear to reduce the tangential forces transmitted to the teeth of the engaging gears. This capability of controlling the reduction of the tangential forces of the drive gear permit a controlled distribution of forces within a drive train thereby permitting variable output speeds).

As a consequence of the setting of spoke 26 at point 30, planetary gear 56 will be effectively driven only by sun wheel 50 through sun gear 54. At the other extreme, if spoke 26 is fixed at imaginary point 32, a totally different result will occur. That is, sun wheel 50 becomes fixed or nearly fixed and substantially all the driving force of the input shaft will be transmitted through to ring 47, which will in turn drive planetary gear 56 via the engagement with ring teeth 46. In each of the two foregoing extreme examples the end result is that planetary gear 56 is driven in its orbit in the same direction as the rotation of the drive shaft. However, it is crucial to appreciate that in the first example, due to the ratio of gear size between the ring gear and sun gear, planetary gear 56 will be driven at its relative slowest speed and in the second example planetary gear 56 will be driven at its relative fastest speed.

The speed control adjusting effect imparted to toothed wheel 38 by spoke 26 may be fixed at any point along the 180° arc through the reciprocating motion of control sleeve 14. The effect of an intermittent setting will be to adjust the output speed of planetary gear 56 and thus driven shaft 60 at a speed intermittent between the slowest and fastest speed derivable from the 0° or the 180° settings previously described. That is, when spoke 26 engages wheel 38 somewhere about midpoint of its arc, a driving force is transmitted to both ring 47 and sun wheel 50, and in approximately equal magnitude, with the end result that output shaft 60 is driven at a speed in approximately the middle of its range of speeds. In essence, by varying the setting of spoke 26 between the points 30 and 32, the effect will be to gradually vary the output speed of shaft 60 to infinitely variable speeds ranging from lowest output speed (produced when spoke 26 is fixed at point 30) to the highest speed (when spoke 26 is fixed at point 32).

Referring now to FIG. 3, a modified form of the speed control mechanism is shown. Control pin 70 operates through the cam slot (not shown in FIG. 3) as previously described and shown in FIGS. 1 and 2. In FIG. 3 control rod 72 is secured at its one end to control pin 70 and at its other end, through sleeve 73, to pivotal arm 74. Pivotal arm 74 is a rigid member pivotally mounted at its one end on control rod 72 and at its other end supports wheel axle 71. This control mechanism will also operate if pivotal arm 74 is rigidly secured to control rod 72 as to form a single, rigid, continuous control rod.

Spoke 26 shown in FIGS. 1 and 2 is replaced by roller 37. The point of contact of roller 37 on wheel inner rolling surface 41 will direct the drive force to wheel 38 in a similar manner to that of spoke 26. Radial actuation of control rod 72 will pivot arm 74 in an arc less than 180° (range of pivot shown by pivotal range arrow 75. Force vector arrow 77 indicates direction of force). Tabs 45 extending from wheel 38 retain the wheel in its axial position.

Referring now to FIG. 4, a cross section of an alternate embodiment of this invention is shown. In FIG. 4 within housing 79, input drive shaft 78 is shown. Control sleeve 106 is mounted reciprocally on drive shaft 78 by virtue of splines 96 to allow its rotary motion with drive shaft 78 but to also permit a reciprocal movement thereon in the same manner as described for FIGS. 1 and 2. Rolling elements 108 permit the relative rotary motion between control outer raceway 110 and drive shaft 78. Drive arm 80 is rigidly secured to control sleeve 106. Drive arm 80 may be seen in a top plan view in greater detail in FIG. 6.

Figure 6:
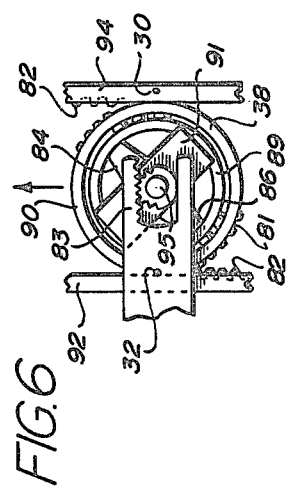
FIG. 6 shows a cross section taken on lines 6—6 of FIG. 4.

Looking now at FIG. 6 which is a top plan view taken on lines 6—6 of FIG. 4, drive control arm 80 ends in rack 83. Rack 83 engages pinion 85. Lateral movement of control sleeve 106 along the axis of drive shaft 78 will result in lateral movement of rack 83 and the pivotal movement of pinion 85. The effect of the pivotal movement of pinion 85 is to pivotally turn spoke 84 and 86. Spoke 84 engages inner raceway 89 in the same manner as described previously in FIGS. 1 and 2 in regard to wheel raceway 34. Spoke 86 provides drive force when drive is in reverse drive. A setting of spoke 84 at imaginary points 30 will result in ring disk 94 remaining stationary or almost stationary and disk 92 being driven relatively faster. Conversely, a setting of spoke 84 at imaginary point 32 will result in disk 92 remaining stationary or almost stationary and ring disk 94 being driven relatively faster.

Now, referring back to FIG. 4, the driving mechanism previously described may be seen in more detail. In FIG. 4 disk 92 is shown in cross section including its bearing support on main shaft 93. Disk 92 engages toothed wheel 90 through right angle disk teeth 82. Rolling surfaces 97 on each disk and rolling surfaces 81 on wheel 90 permit the wheel to roll on the disks. FIG. 4 shows toothed wheel 90 with support plates 91 mounted on both sides of the wheel. Wheel 90 in this embodiment is supported by wheel support axle 88. Disk 92 is shown integrally connected to sun gear 112 by main shaft 93 which in turn engages planetary gear 114. Planetary gear 114 engages output arm 116 which is in turn connected to output shaft 118.

Additionally wheel 90 also engages ring disk 94. Rolling elements 98 rotatably support ring disk 94 on housing 79. Ring gear 99 likewise engages planetary gear 114. Counterbalance 104 is connected to output shaft 118 and operates therewith to achieve proper balance during planetary gear rotation. Plain bearings 100 are shown in various parts of the assembly and operate to reduce friction at these points in a manner well known in the art.

Figure 5:
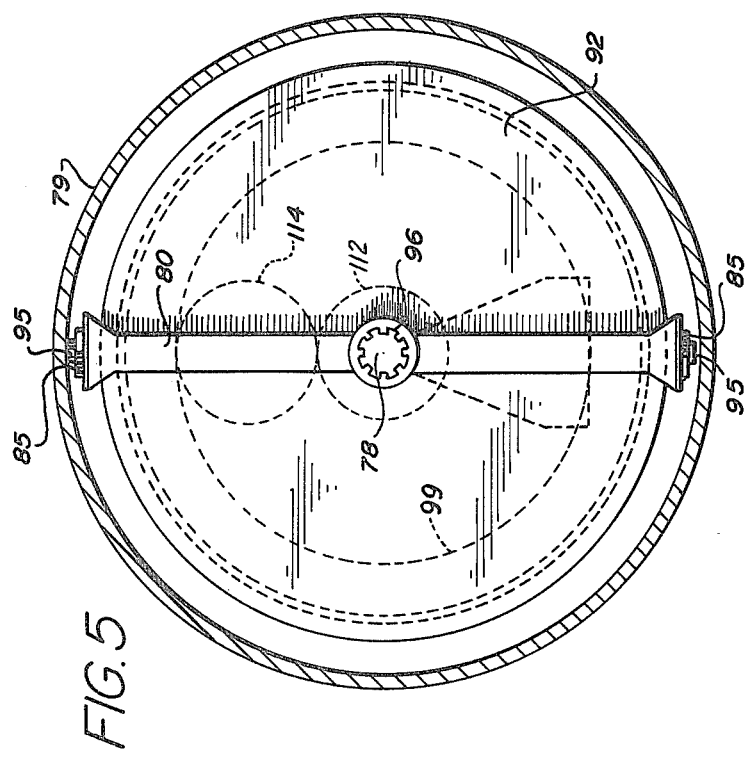
FIG. 5 is a cross section of FIG. 4 taken on lines 5—5.

The transmission shown in FIGS. 4, 5 and 6 operates in a manner analogous to that described in regard to FIGS. 1 and 2. That is, drive arm 80 may be reciprocally operated. Thus, through the operation of its rack and pinion 85, spoke 84 may be set to fix a force which will result in a driving force being transmitted to either disk 92 or ring disk 94, or proportionately to both. Where, for example, spoke 84 is fixed at imaginary point 30, disk 92 will rotate at its fastest speed, and ring disk 94 at its slowest speed, causing sun gear 112 to become substantially the sole driving force (through main shaft 93) for planetary gear 114. Thus, the result is that planetary gear 114 (through output arm 116) drives output shaft 118 at its slowest relative speed. Conversely, a fixing of spoke 84 at imaginary point 32 will increase the rotative speed of ring disk 94 relative to disk 92. As a result, planetary gear 114 which engages ring gear 99, through output arm 116, will drive output shaft 118 at its fastest relative speed. Intermediate settings of spoke 84 will result in intermediate output speeds of shaft 118.

Figure 7:
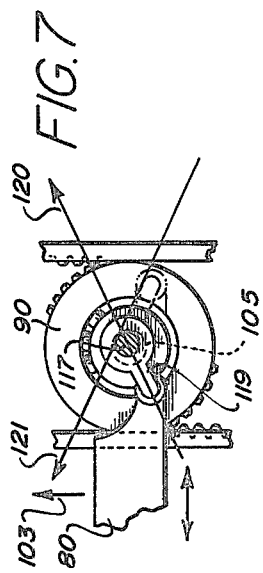
FIG. 7 shows a modified form of the speed control mechanism shown in FIGS. 4, 5 and 6.

FIG. 7 is a modified form of the speed control mechanism of this invention. Pivotal arm 119 and axle 88 replace spoke 27 for the function of transmitting drive force to wheel 90. Rotation of drive control arm 80 (direction shown by arrow 103) will force control arm and axle 88 against inner raceway opening 105 and transmit a drive force to wheel 128 (force direction shown by arrow 120) (arrow 121 shows other extreme position of adjustment). Phantom lines show pivot arm 119 in its opposite position. (For clarity retaining flange 95, though present, is omitted in this figure).

Output planetary gears in the first and second embodiment can be replaced with additional input speed control mechanisms in order to operate in reverse or to vary the speed range of the device.

Referring now to FIG. 8, a third embodiment of the transmission of this assembly is shown. FIGS. 8, 9, 10, 11 and 12 contemplate an eccentric gearing arrangement. In FIG. 8, clockwise rotation of spoke 127 by drive shaft 123 will cause spoke 127 to transmit a radial force to wheel 128 in the direction of force vector arrow 129. This action causes wheel 128 to behave like a lever in which the pivot of the lever is on raceway 132 as indicated by arrow 130. The result is a torque-producing rolling action of wheel 128 which substantially reduces the tangential force transmitted to ring teeth 131 by wheel teeth 149. The force transmitted to ring teeth 131 by wheel teeth 149 will rotate ring 133 in the same direction as the drive shaft rotates. Wheel 128 is mounted eccentrically in relationship to ring 133. The inward axial movement of cam bar 134 by attached control bearing 126 will force movable spoke 127 radially outward. The outward movement of spoke 127 will urge spoke 127 to slide into the position shown in phantom.

The outward movement of spoke 127 will cause the radial force transmitted to wheel 128 by spoke 127 to increase while simultaneously the tangential force transmitted to ring teeth 131 by wheel teeth 149 will decrease. Thus, as the position of spoke 127 is moved towards its phantom position, the result will be that the rotary motion of ring 133 will decrease relative to wheel rotation. The varying speed of rotation of ring 133 relative to wheel rotation will in turn vary the rotational speed of the orbit of planetary gear 136. (The relationship between ring 133 and planetary gear 136 is more easily seen in FIG. 9). Planetary gear 136 in turn, through its connection to planetary gear support arm 139 drives output shaft 137. The eccentric rotation of wheel 128 is transmitted to sun gear 140 by the coupling action of leaf springs 142 and square floating support plate 143. Sun gear 140 and ring 133 provide a common drive force to planetary gear 136.

Other parts of the assembly of FIGS. 8, 9, 10, 11 and 12 include housing 124, shaft support bearings 147 including rolling elements 125 and plain bearings 155, each of which function in the same manner as described in their counterparts in FIGS. 1 through 7. Rolling elements 138 rotatably support ring 133 on housing 124. Supports 145 join leaf springs 142 to wheel 128 and to sun gear 140. Raceway 150 and rolling elements 148 permit wheel rotation relative to spokes 127 and 144.

In FIG. 8, the speed control mechanism of this embodiment is shown from another view and spoke support 146 within which spoke 127 is radially mounted is shown. The operation of spoke 127 will be described in more detail in regard to FIG. 12.

Referring now to FIG. 12, which is taken along lines 12—12 of FIG. 8 and FIG. 10, drive shaft 123 is shown with cam bar 134 positioned in bar groove 154. Movement of cam bar 134 in the direction as indicated by directional arrow 156 will result in the transverse movement of spoke 127 as shown by directional arrow 157. At each and every position of spoke 127, stabilizer cam bar 152 operates to urge stabilizing spoke 144 in a radial direction causing it to also engage raceway 150. Stabilizer cam bar 134 is also attached to control bearing inner raceway 158. (not shown)

FIG. 10 shows in detail stabilizer cam bar 152 which when moved laterally will induce transverse movement in stabilizing spoke 144 in synchronized but opposite movement relative to spoke 127.

There are many variations which may be practiced within the scope of this invention.

A variable speed differential can be provided by simply adding an output shaft to the wheel engaging gears in the first and second embodiments in place of the planetary assembly.

In the third embodiment an output axle may be added to wheel 38 and also to ring 47 to bypass the planetary gear function.

What is claimed is:

1. An infinitely variable speed transmission comprising:
    (a) a rotatably mounted input drive shaft;
    (b) a toothed wheel rotatably linked to said drive shaft, said wheel including an outer and an inner perimeter;
    (c) force directing means moveably mounted on said drive shaft and disposed proximate the hub of said wheel, said force directing means being capable of fixidly engaging said wheel inner perimeter at a point along the path of its pivot;
    (d) actuating means for positioning and fixidly setting said force directing means;
    (e) a first toothed circular raceway means rotatably engaging said wheel along a part of the outer perimeter of said wheel;
    (f) sun gear means concentrically affixed to said circular raceway means;
    (g) a second toothed circular raceway means rotatably engaged with said wheel along another part of the outer perimeter of said wheel at a point 180° from said first raceway engagement;
    (h) ring gear means concentrically affixed to said second circular raceway means;
    (i) a planetary gear rotatably engaging both said sun gear and said ring gear; and,
    (j) output drive means rotatably connected to said planetary gear whereby variable settings of said force directing means causes input driving forces to be transmitted variously to said sun gear and said ring gear thereby producing variable speeds of said planetary gear and said output drive means.

2. The variable speed transmission as claimed in claim 1 wherein said force directing means includes a spoke assembly pivotably mounted at said wheel center, said spoke assembly including a force fixing forward spoke to engage said wheel inner perimeter and a force directing rearward spoke connected to said actuating means.

3. An infinitely variable speed transmission wherein:
   (a) a rotatably supported toothed sun wheel disposed concentrically within a rotatably supported annular toothed raceway;
   (b) a toothed wheel having an inner and outer perimeter disposed between and engaging said toothed sun wheel and said toothed raceway so as to have a rolling surface and toothed interengagement therewith;
   (c) an adjustable drive member engaging said inner perimeter;
   (d) a rotatable drive shaft positioned concentric to said toothed sun wheel;
   (e) means for supporting said adjustable drive member;
   (f) actuating means for adjusting the point of contact of said drive member along the inner perimeter of said toothed wheel;
   (g) a ring gear axially secured to said toothed raceway;
   (h) a sun gear axially secured to said toothed sun wheel;
   (i) a planetary driven gear disposed between and in driving engagement with said ring gear and said sun gear; and,
   (j) a driven member rotatably supporting said planetary gear, whereby a directional force applied by said adjustable drive member to said toothed wheel causes a variable output speed to be transmitted to said planetary gear and said output member.

4. The variable speed transmission according to claim 3 wherein said adjustable drive member comprises:
   (a) a roller positioned within said inner perimeter for rotation thereon, said roller being supported by a radially moveable member; and,
   (b) said drive shaft supporting said moveable member for rotation therewith, whereby radial actuation of said support member changes the point of contact of said wheel on said inner perimeter.

5. The variable speed transmission according to claim 3 wherein said adjustable drive member comprises a roller positioned within said inner perimeter for rotation thereon and a pivotal arm connecting said roller to a radial moveable arm with said drive shaft supporting said moveable arm; and wherein said actuating means comprises an axial moveable rod positioned along said drive shaft and having cam means for engaging and imparting a radial movement to said moveable arm.

6. An infinitely variable speed transmission comprising:
   (a) a rotatably supported disk including teeth and a rolling surface disposed about the periphery of said disk;
   (b) a second rotatably mounted disk axially disposed relative said first said disk and including teeth and a rolling surface disposed about the periphery of said second disk;
   (c) a rotatably mounted toothed wheel disposed between and in driving engagement with said teeth and said rolling surfaces of both said first and said second disk, said wheel having an inner concentric raceway;
   (d) an adjustable drive member disposed in engagement with said inner raceway whereby a variable directional drive force applied to said wheel by said drive member is variably transmitted to each of said disks;
   (e) a sun gear axially secured to said first disk;
   (f) a ring gear axially secured to said second disk;
   (g) a planetary driven gear disposed between and in engagement with said ring gear and said sun gear; and,
   (h) a driven member concentric to said disks and rotatably supporting said planetary gear.

7. An infinitely variable speed transmission according to claim 6 wherein said adjustable drive member comprises:
   (a) a drive shaft positioned concentric to said disks;
   (b) a radially extended arm connected to said drive shaft for rotation therewith and axially moveable thereon; and,
   (c) a moveable drive member supported by said drive arm engaging a point along said inner concentric raceway, whereby axial movement of said drive arm changes the setting point of engagement of said moveable drive member along said inner raceway.

8. An infinitely variable speed transmission according to claim 6 wherein said adjustable drive member comprises a roller pivotably mounted on said drive arm.

9. An infinitely variable speed transmission comprising:
   (a) a rotatably mounted drive shaft including spoke means;
   (b) a wheel having an inner concentric raceway, said drive member spoke means engaging said inner concentric raceway;
   (c) means for adjusting the point of contact of said drive member spoke means relative to said inner concentric raceway;
   (d) a rolling surface with teeth mounted along said wheel rim;
   (e) a rotatably mounted annular raceway including a rolling surface and teeth surrounding said wheel, said wheel disposed within said raceway so that when said said wheel teeth interengage said raceway teeth, said wheel rolls eccentrically on said raceway;
   (f) a rotatably mounted sun gear coupled to said wheel and disposed concentrically relative to said surrounding raceway;
   (g) a planetary gear rotatably engaging said sun gear and tooth portions of said annular raceway;
   (h) an output shaft in concentric alignment relative to said surrounding raceway and said drive shaft; and,
   (i) means for rotatably supporting said planetary gear to said output shaft.

* * * * *